US007229944B2

United States Patent
Shao-Horn et al.

(10) Patent No.: US 7,229,944 B2
(45) Date of Patent: Jun. 12, 2007

(54) FIBER STRUCTURES INCLUDING CATALYSTS AND METHODS ASSOCIATED WITH THE SAME

(75) Inventors: Yang Shao-Horn, Cambridge, MA (US); John Paul Kurpiewski, River Vale, NJ (US); Quinn C. Horn, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 10/898,031

(22) Filed: Jul. 23, 2004

(65) Prior Publication Data

US 2006/0019819 A1  Jan. 26, 2006

(51) Int. Cl.
  *B01J 21/18*   (2006.01)
  *B01J 23/00*   (2006.01)
  *D01F 9/12*    (2006.01)
  *B32B 9/00*    (2006.01)
  *D02G 9/00*    (2006.01)

(52) U.S. Cl. .................. 502/182; 502/180; 423/447.1; 423/447.5; 428/367

(58) Field of Classification Search ................ 502/180, 502/182; 428/367; 423/447.1, 447.5
  See application file for complete search history.

(56) References Cited

U.S. PATENT DOCUMENTS

| | | | | |
|---|---|---|---|---|
| 3,972,735 A | * | 8/1976 | Breault | ..................... 252/182.1 |
| 4,259,092 A | * | 3/1981 | Matsuo et al. | ................. 95/113 |
| 4,348,213 A | * | 9/1982 | Armond | ....................... 95/103 |
| 4,416,800 A | * | 11/1983 | Abe et al. | .................... 502/159 |
| 4,591,334 A | * | 5/1986 | Brooks | ........................ 432/15 |
| 4,851,304 A | * | 7/1989 | Miwa et al. | ................... 429/40 |
| 4,876,115 A | | 10/1989 | Raistrick | |
| 4,927,718 A | | 5/1990 | Ross, Jr. | |

(Continued)

FOREIGN PATENT DOCUMENTS

KR   102002008227 A   1/2002

OTHER PUBLICATIONS

Bessel, Carol A. et al., "Graphite Nanofibers as an Electrode for Fuel Cell Applications" J. Phys. Chem. 105(6):1115 (2001), no month.

(Continued)

*Primary Examiner*—J. A. Lorengo
*Assistant Examiner*—Patricia L. Hailey
(74) *Attorney, Agent, or Firm*—Wolf, Greenfield & Sacks, P.C.

(57) ABSTRACT

Fiber structures that include a catalytic material are provided. The fiber structures (e.g., membranes) may be formed of interconnected carbon fibers. The catalytic material may be in the form of nanosize particles supported on the fibers. In one method of the invention, the structures are produced by electrospinning a polymeric material fiber structure that is subsequently converted to a carbon fiber structure in a heat treatment step which also causes the catalytic material particles to nucleate on the carbon fibers and grow to a desired size. The catalytic material may be uniformly distributed across the carbon fiber structure and the amount of catalytic material may be controlled. These factors may enhance catalytic performance and/or enable using less catalytic material for equivalent catalytic performance which can lead to cost savings, amongst other advantages. The fiber structures may be used in a variety of applications including electrodes in batteries and fuel cells.

45 Claims, 5 Drawing Sheets

U.S. PATENT DOCUMENTS

| | | | |
|---|---|---|---|
| 5,047,133 A | 9/1991 | Allen | |
| 5,084,144 A | 1/1992 | Reddy et al. | |
| 5,089,135 A | 2/1992 | Yoneyama et al. | |
| 5,171,644 A | 12/1992 | Tsou et al. | |
| 5,314,760 A | 5/1994 | Tsou et al. | |
| 5,424,054 A * | 6/1995 | Bethune et al. | 423/447.2 |
| 5,436,067 A * | 7/1995 | Hanamoto et al. | 428/293.4 |
| 5,482,906 A * | 1/1996 | Sakai et al. | 502/402 |
| 5,648,027 A * | 7/1997 | Tajiri et al. | 264/43 |
| 5,648,307 A | 7/1997 | Yasuda et al. | |
| 5,650,370 A * | 7/1997 | Tennent et al. | 502/174 |
| 5,783,325 A | 7/1998 | Cabasso et al. | |
| 5,879,827 A | 3/1999 | Debe et al. | |
| 6,040,077 A | 3/2000 | Debe et al. | |
| 6,057,054 A | 5/2000 | Barton et al. | |
| 6,080,504 A | 6/2000 | Taylor et al. | |
| 6,087,032 A | 7/2000 | Yoshitake et al. | |
| 6,110,590 A | 8/2000 | Zarkoob et al. | |
| 6,127,059 A | 10/2000 | Kato | |
| 6,383,972 B1 * | 5/2002 | Parmentier et al. | 502/180 |
| 6,428,722 B1 | 8/2002 | Furuya | |
| 6,432,571 B1 | 8/2002 | Debe et al. | |
| 6,444,347 B1 | 9/2002 | Ouvry et al. | |
| 6,489,051 B1 * | 12/2002 | Inoue | 429/34 |
| 6,503,655 B1 | 1/2003 | Petricevic et al. | |
| 6,686,308 B2 | 2/2004 | Mao et al. | |
| 6,713,034 B2 * | 3/2004 | Nakamura et al. | 423/447.2 |
| 6,787,229 B1 * | 9/2004 | Muradov | 428/367 |
| 7,018,601 B2 * | 3/2006 | Yanagisawa et al. | 423/447.1 |
| 2001/0031389 A1 | 10/2001 | Appleby et al. | |
| 2001/0036570 A1 | 11/2001 | Tosco et al. | |
| 2002/0006539 A1 | 1/2002 | Kubota et al. | |
| 2002/0013112 A1 | 1/2002 | Bontaites et al. | |
| 2002/0034675 A1 | 3/2002 | Starz et al. | |
| 2002/0049134 A1 | 4/2002 | Imazato | |
| 2002/0073849 A1 | 6/2002 | Buettner et al. | |
| 2002/0089094 A1 | 7/2002 | Kleinmeyer et al. | |
| 2002/0098407 A1 | 7/2002 | Kunisa et al. | |
| 2002/0100725 A1 | 8/2002 | Lee et al. | |
| 2002/0102461 A1 | 8/2002 | Baker et al. | |
| 2002/0122840 A1 | 9/2002 | Lee et al. | |
| 2002/0172867 A1 | 11/2002 | Anglin | |
| 2002/0175449 A1 | 11/2002 | Chu et al. | |
| 2002/0177032 A1 | 11/2002 | Suenaga et al. | |
| 2003/0031917 A1 | 2/2003 | Katori et al. | |
| 2003/0041444 A1 | 3/2003 | Debe et al. | |
| 2003/0054035 A1 | 3/2003 | Chu et al. | |
| 2003/0073573 A1 | 4/2003 | Baker et al. | |
| 2003/0082431 A1 | 5/2003 | Klitsner et al. | |
| 2003/0104936 A1 | 6/2003 | Mao et al. | |
| 2003/0108480 A1 | 6/2003 | Baker | |
| 2003/0118815 A1 | 6/2003 | Rodriquez | |
| 2003/0137083 A1 | 7/2003 | Ko et al. | |
| 2003/0161781 A1 | 8/2003 | Cabasso et al. | |
| 2003/0168756 A1 | 9/2003 | Balkus et al. | |
| 2003/0186109 A1 | 10/2003 | Huang et al. | |
| 2003/0190383 A1 | 10/2003 | Kim et al. | |
| 2003/0192468 A1 | 10/2003 | Goertzen | |
| 2003/0194557 A1 * | 10/2003 | Wilde et al. | 428/408 |
| 2003/0195611 A1 | 10/2003 | Greenbaugh et al. | |
| 2003/0201560 A1 | 10/2003 | Vollrath et al. | |
| 2003/0210606 A1 | 11/2003 | Chase et al. | |
| 2003/0215624 A1 | 11/2003 | Layman et al. | |
| 2003/0228522 A1 | 12/2003 | Yang et al. | |
| 2003/0232195 A1 | 12/2003 | Reneker et al. | |
| 2004/0013819 A1 | 1/2004 | Hoy et al. | |
| 2004/0013873 A1 | 1/2004 | Wendorff et al. | |
| 2004/0051201 A1 | 3/2004 | Greenhalgh et al. | |
| 2004/0106343 A1 | 6/2004 | Senecal et al. | |
| 2004/0166048 A1 * | 8/2004 | Morita et al. | 423/447.3 |
| 2005/0135982 A1 * | 6/2005 | Pavlovsky | 423/239.1 |
| 2005/0238948 A1 * | 10/2005 | Mei et al. | 429/40 |
| 2005/0245390 A1 * | 11/2005 | Ota et al. | 502/182 |

OTHER PUBLICATIONS

Demir, Mustafa M. et al., "Palladium Nanoparticles by Electrospinning from Poly(acrylonitrile-co-acrylic acid)—PdCl$_2$ Solutions. Relation Between Preparation Conditions, Particle Size, and Catalytic Activity," Macromolecules 37:1787 (2004), no month.

Endo, Morinobu et al., "Selective and Efficient Impregnation of Metal Nanoparticles on Cup-Stacked-Type Carbon Nanofibers," Nano. Lett. 3(6):723 (2003), no month.

Frenot, Audrey et al., "Polymer Nanofibers Assembled by Electrospinning," Curr. Op. in Colloid and Interface Science 8:64 (2003), no month.

Liu, Zhaolin et al., "Preparation and Characterization of Platinum-Based Electrocatalysts on Multiwalled Carbon Nanotubes for Proton Exchange Membrane Fuel Cells," Langmuir 18:4054 (2002), no month.

Nugent, J.M. et al., "Fast Electron Transfer Kinetics on Multiwalled Carbon Nanotube Microbundle Electrodes," Nano. Lett. 1(2):87 (2001), no month.

Regan, B.C. et al., "Carbon Nanotubes as Nanoscale Mass Conveyors," Nature 428:924 (2004).

Reneker, Darrell H. et al., "Nanometre Diameter Fibres of Polymer, Produced by Electrospinning," Nanotechnology 7:216 (1996), no month.

Schreuder-Gibson, Heidi et al., "Characteristics of Electrospun Fibers Containing Carbon Nantubes," 197th Meeting fo Electrochemical Society, Toronto, Canada, May 14-18, (2000).

Steigerwalt, Eve S. et al., "A Pt-Ru/Graphitic Carbon Nanofiber Nanocomposite Exhibiting High Relative Performance as a Direct-Mthanol Fuel Cell Anode Catalyst," J. Phys. Chem. 105:8097 (2001), no month.

Yoshitake, T. et al., "Preparation of Fine Platinum Catalyst Supported on Single-Wall Carbon Nanohorns for Fuel Cell Application," Physica B 323:124 (2002), no month.

* cited by examiner

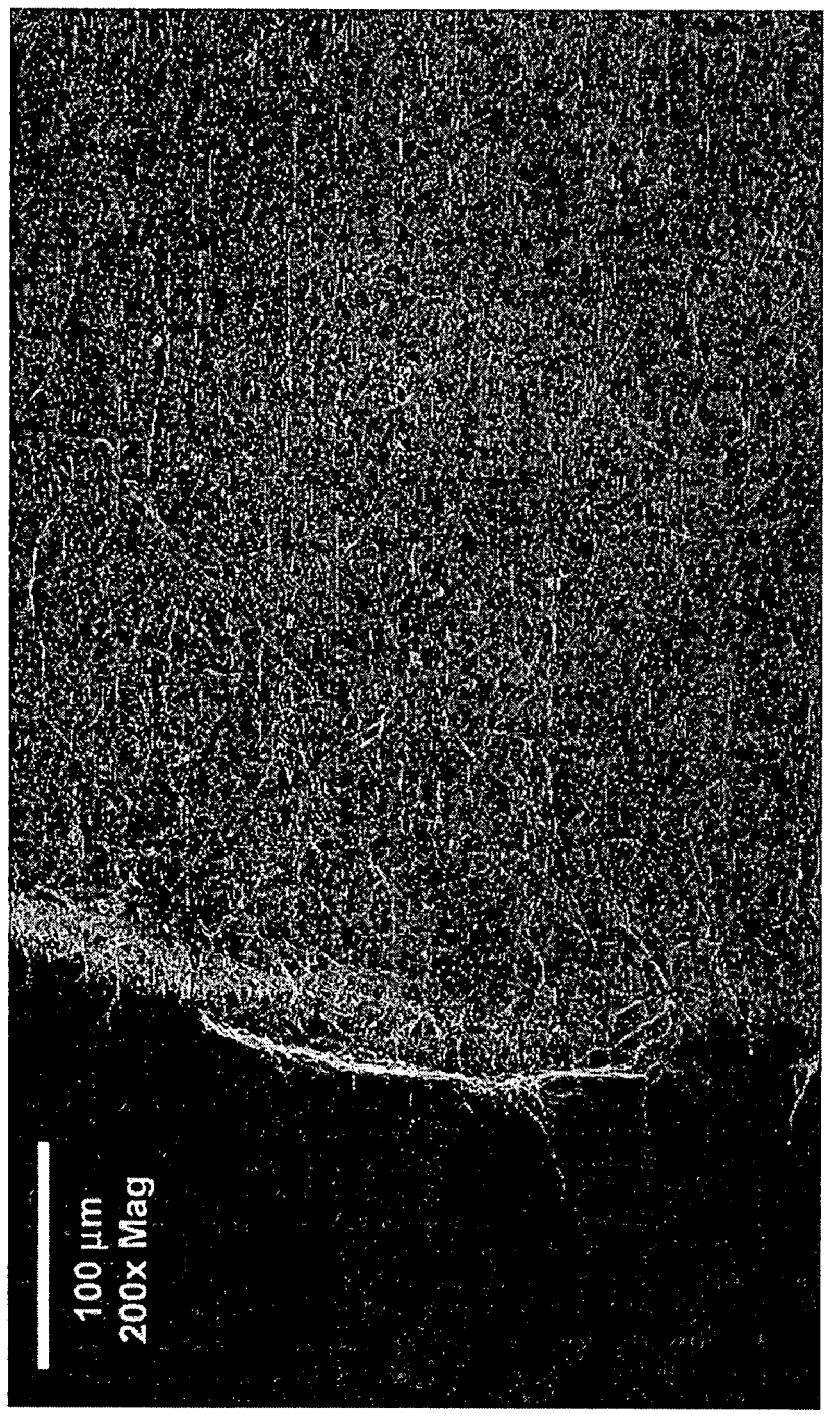

FIBER STRUCTURES INCLUDING CATALYSTS AND METHODS ASSOCIATED WITH THE SAME

FIELD OF THE INVENTION

The invention relates generally to fiber structures and, more particularly, to carbon fiber structures that include a catalyst and methods associated with the same.

BACKGROUND OF THE INVENTION

A catalyst is a substance that increases the rate of a chemical reaction without, itself, being consumed in the reaction. Catalysts function by lowering the activation energy associated with the rate-determining step in a chemical reaction. As a result, the chemical reaction is accelerated.

Catalysts may be used in numerous applications. For example, electrochemical devices (e.g., fuel cells, batteries) may utilize catalysts. These devices can include electrodes (i.e., an anode and a cathode) with a solid or liquid ionic conducting and electronically insulating phase therebetween. Fuel materials are brought in contact with the anode and an oxidizing gas (e.g., oxygen) is brought in contact with the cathode. The fuel material may be oxidized in a chemical reaction which may be accelerated by the presence of the catalyst at the anode. The oxidizing gas is reduced in a chemical reaction which also may be accelerated by a catalyst at the cathode. The device generates electricity when electrons generated in the fuel oxidation reaction at the anode flow through an external circuit to the cathode where the electrons are consumed in the reduction reaction.

A number of different materials may be suitable catalysts for reactions that occur at electrodes in electrochemical devices. Examples of suitable catalysts include metals such as platinum and palladium, as well as alloys and compounds thereof. Because such catalytic materials are relatively expensive, it would generally be desirable to use less catalytic material if sufficient catalytic activity can be maintained.

SUMMARY OF THE INVENTION

The invention provides fiber structures (e.g., membranes) which include catalytic material, as well as methods associated with the same. The structures may be used, for example, as electrodes in electrochemical devices.

One aspect of the invention involves methods of making structures. In one embodiment, a method of forming a carbon fiber structure is provided. The method comprises electrospinning a polymer solution to form a polymeric material fiber structure. The method further comprises heat treating the polymeric material fiber structure to convert the polymeric material fiber structure to a carbon fiber structure including catalytic material particles supported on the carbon fiber structure.

In another embodiment, a method of forming a carbon fiber structure is provided. The method comprises converting a polymeric material fiber structure to a carbon fiber structure, and associating a catalytic material with the carbon fiber structure.

In another aspect, a structure is provided. The structure comprises a carbon fiber structure including at least one carbon fiber having a length of greater than about 500 microns. A catalytic material is supported on the carbon fiber structure.

In another aspect, an electrode is provided. The electrode comprises a carbon fiber structure and a catalytic material supported on the carbon fiber structure. The catalytic material concentration is less than 0.2 mg catalytic material/$cm^2$ area of the carbon fiber structure.

Other aspects, embodiments and features of the invention will become apparent from the following detailed description of the invention when considered in conjunction with the accompanying drawings. The accompanying figures are schematic and are not intended to be drawn to scale. In the figures, each identical, or substantially similar component that is illustrated in various figures is represented by a single numeral or notation. For purposes of clarity, not every component is labeled in every figure. Nor is every component of each embodiment of the invention shown where illustration is not necessary to allow those of ordinary skill in the art to understand the invention. All patent applications and patents incorporated herein by reference are incorporated by reference in their entirety. In case of conflict, the present specification, including definitions, will control.

BRIEF DESCRIPTION OF THE DRAWINGS

FIGS. 3A–3C are respective copies of SEM images at different magnifications of a carbon fiber structure of the invention as described in Example 1.

DETAILED DESCRIPTION

The invention provides fiber structures that include catalytic material. The fiber structures (e.g., membranes) may be formed of interconnected carbon fibers. The catalytic material may be in the form of particles supported on the fibers. In one method of the invention (i.e., the electrospinning/heat treatment method), the structures are produced by electrospinning a polymeric material fiber structure in the presence of a catalytic material precursor. The polymeric material is subsequently converted to a carbon fiber structure in a heat treatment step which may also cause the catalytic material particles to nucleate on the carbon fibers and grow to a desired size. The catalytic material may be uniformly distributed across the carbon fiber structure and the amount of catalytic material may be controlled. These factors may enhance catalytic performance and/or enable using less catalytic material for equivalent catalytic performance which can lead to cost savings, amongst other advantages. The fiber structures may be used in a variety of applications including as electrodes in batteries and fuel cells.

Figure 1:
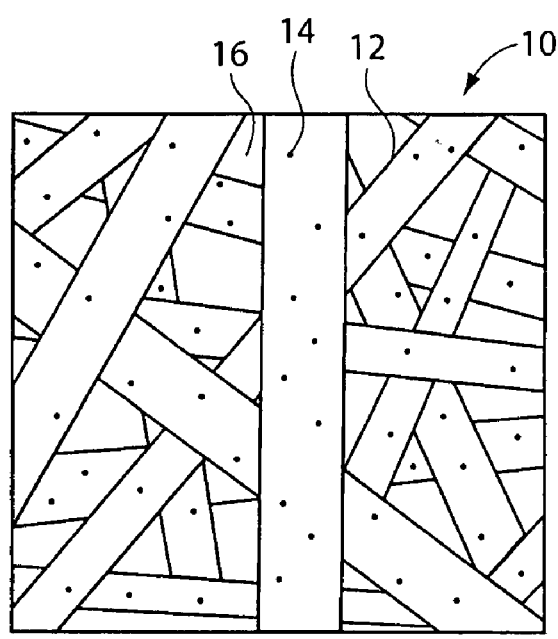
FIG. 1 shows the structure of a carbon fiber structure supporting catalytic material particles according to one embodiment of the invention.

FIG. 1 shows a fiber structure 10 according to one embodiment of the invention. The structure is formed of interconnected carbon fibers 12. Catalytic particles 14 are supported on the carbon fibers. During use, the particles catalyze desired chemical reactions between reactants that are exposed to the particles. As described further below, the particles are distributed throughout the fiber structure which can lead to uniform catalytic activity across the structure which may result in performance advantages.

Although the catalytic material is in the form of particles supported on carbon fibers in the illustrative embodiment, the catalytic material may be in other forms (e.g., coatings) and/or otherwise associated with fiber structures in other embodiments.

In many embodiments and applications, it may be preferable for the carbon fiber structure to be a membrane. Membranes generally are relatively thin sheet-like structures. However, non-membrane structures are also encompassed by the invention. For example, the fiber structure may be a bundle or spherical, amongst others.

Structure 10 may have any suitable dimensions. The dimensions may be dictated, in part, by the application in which the structure is used. In some embodiments (e.g., when the structure is a membrane), the structure has a dimensional area on the order of 1 $cm^2$ to 500 $cm^2$. However, it should be understood that the structures may also have a wide range of areas outside this range.

The structure may be formed over a range of thicknesses. Typical thicknesses are on the order of microns (e.g., when the structure is a membrane), though other thicknesses are also possible. In some embodiments, the structure is very thin. It may be particularly advantageous to use thin structures to form electrodes, as described further below. For example, the structure (and electrode) thickness may be less than 10 microns; in some cases, less than 5 microns; and, in some cases, even less than 1 micron. In some cases, it may be beneficial for the structure (and electrode) thickness to be greater than 0.1 micron to ensure sufficient mechanical integrity and catalytic activity. In particular, the electrospinning/heat treatment method of the invention enables formation of very thin structures.

The illustrative structure includes a plurality of pores 16 formed between the carbon fibers. The pores allow reactants (e.g., gaseous species) to pass through the structure, while being exposed to the catalytic particles which catalyze the desired reactions. The pores generally do not extend across the entire the structure (along any one axis). However, many pores may be interconnected to form pathways that do extend across the structure (along any one axis) so that the reactants (e.g., gaseous species) may flow through the structure.

The structure may be formed of a plurality of interconnected carbon fibers. However, it is also possible for a single carbon fiber to be intertwined to produce the structure. For example, in some electrospinning/heat treatment methods, a polymeric material structure is formed from a single fiber in the electrospinning step which is subsequently converted to a carbon fiber structure in the heat treatment step. Although, even when using this electrospinning/heat treatment method, the structure is more typically formed of a plurality of carbon fibers because of the tendency of polymeric material (and/or carbon) fibers to break during processing.

In certain embodiments, some of the carbon fibers may be fused together at points where the fibers intersect. This may arise when polymeric material fibers are fused together during the beginning stage of heat treatment which are later converted to carbon fibers that remain fused together at intersection points. This fusion may lead to increased mechanical integrity and/or increased conductivity. It should be understood that some of the fibers may be merely in physical contact with one another at intersection points without being fused together.

Carbon fibers 12 comprise at least some amount of carbon and, in most cases, carbon is the primary component of the fibers. However, the carbon fibers may also comprise other elements. For example, the carbon fibers may comprise nitrogen and/or hydrogen (or, other elements) that are residual from the polymeric material formed in the electrospinning/heat treatment method. In these cases, the conversion to carbon during heat treatment is not complete. In some embodiments, the weight percentage of carbon in the carbon fibers is greater than about 75% (e.g., between about 80% and 95%, or between about 90% and 98%) based on the total weight of the fiber. It should be understood that, in some embodiments, the fibers are formed entirely of carbon.

In general, the carbon fibers should have high enough carbon concentration to be sufficiently conductive for the application in which the structure is used. In some embodiments, the fibers (and structure) have a resistivity of less than about 0.1 Ohms-m. For example, the resistivity may be between about $10^{-2}$ Ohms-m and about $10^{-6}$ Ohms-m; or, between about $10^{-2}$ Ohms-m and about $10^{-4}$ Ohms-m. The specific resistivity (and conductivity) of the fibers (and structure) may depend on the relative percentage of carbon in the fibers which, in turn, may be related to the processing (e.g., heat treatment) conditions.

It should be understood, however, that fibers (and structures) of the invention may have resistivities outside the above-noted ranges.

Fibers 12 can have any suitable dimension. In some embodiments, the average fiber diameter is greater than about 10 nm; in some embodiments, greater than about 50 nm; and, in some embodiments, greater than about 100 nm. Fiber diameters less than these ranges may cause the structure to have insufficient mechanical integrity. The fiber diameters may be less than about 500 nm. In some cases, the fiber diameters may be less than about 300 nm. Fiber diameters greater than these ranges may be more difficult to process and/or may not be compatible with certain applications. It should be understood that the fiber diameters may be between the above-noted values (e.g., between about 100 nm and 300 nm, between about 100 nm and about 500 nm, etc.). The average fiber diameter may be determined by measuring the diameter of a representative number of fibers of the structure, for example, using SEM (scanning electron microscope) techniques.

The fibers generally have circular-shaped cross-sections, though other cross-sections may also be suitable. In some embodiments, the fibers are preferably solid (i.e., not hollow). The electrospinning/heat treatment method can produce solid carbon fibers. However, it should be understood that in other embodiments, the fibers may be hollow (e.g., tubes).

Structure 10 may include relatively long carbon fibers in some embodiments of the invention. For example, in some embodiments, at least one carbon fiber of the structure has a length of at least about 500 microns; and, in some embodiments, at least one carbon fiber has a length greater than about 1 mm. In some embodiments, it may be possible to achieve carbon fiber lengths of greater than about 1 cm, or even significantly greater. It should be understood that more than one carbon fiber having the above-noted lengths may also be found in the structures of the invention. Fiber length may be measured, for example, using SEM techniques.

In particular, the electrospinning/heat treatment method described further below can produce relatively long carbon fibers. Relatively long carbon fibers may be advantageous in increasing mechanical integrity and conductivity, amongst other advantages. Electrospinning and long fibers may also lead to an increase in the number of fibers that are fused together which, as described above, can also lead to increasing mechanical integrity and conductivity.

The microstructure of the carbon fibers may be amorphous. In some embodiments, the carbon fibers may be formed, in part, of graphite. In these cases, the graphite portions assume the typical graphite crystalline structure. The fibers may include a graphite component, for example, when heat treating temperatures are very high (such as, greater than about 1300° C.).

The catalytic material particles may be formed of any suitable catalytic material. In some embodiments, the particles are formed of a catalytic metal. The following metals may function as catalytic materials in certain applications: palladium, platinum, gold, silver, rhodium, rhenium, iron, chromium, cobalt, copper, manganese, tungsten, niobium, titanium, tantalum, lead, indium, cadmium, tin, bismuth and gallium, amongst others, as well as compounds and alloys of these metals. In particular, palladium and platinum may be preferred catalysts for use in electrochemical devices. Other suitable catalytic materials (and metals) are known to those of skill in the art. The type of catalytic material depends, in part, on the reaction to be catalyzed and, thus, the application in which the structure is used.

In some embodiments, particles 14 have an average particle size of less than one micron. It may be preferred that the particles have sizes on the order of nanometers. For example, the particles may have an average particle size of less than about 50 nm; and, in some cases, less than about 20 nm (e.g., on the order of 5 nm). Small particle sizes may advantageously lead to the relatively uniform distribution of catalytic material throughout the carbon fiber structure, amongst other positive effects.

The particles typically (though not always) have an average particle sizes of greater than 0.5 nm, in part, due to processing limitations. It may be difficult to consistently form particles having average sizes smaller than 0.5 nm across an entire structure.

The specific particle size may be controlled, as described further below, through processing conditions such as heat treatment conditions (e.g., temperature and time). The desired average particle size may depend on several factors including carbon fiber dimensions and catalytic performance.

Average particle sizes may be determined by averaging the particle sizes of a representative number of particles using, for example, SEM techniques. As used herein, the average particle size includes sizes of primary particles and sizes of particle agglomerates.

It should be understood that particle sizes outside the above ranges may be used in certain embodiments of the invention.

It may be preferred for the particle size distribution to be relatively narrow. Narrow particle size distributions promote the uniform distribution of catalytic material throughout the structure.

As described further below, in some preferred embodiments, the particles are relatively homogenously distributed throughout the structure. Also, the particle-to-particle distances on a fiber may be relatively similar. As used herein, the term "particle-to-particle distance" refers to the distance between adjacent particles on a fiber. For example, at least 50% of the actual particle-to-particle distances on fibers of the structure are within ±/−25% of the average particle-to-particle distance on fibers of the structure. In some cases, at least 75% of the actual particle-to-particle distances are within ±/−25% of the average particle-to-particle distance.

The particle-to-particle distance may be between about 50 nm and 1 micron, though other distances are also possible. The particle-to-particle distance depends, in part, on the catalytic material concentration.

Structure 10 may be formed using any suitable method. As noted above, one preferred method of forming the structure is an electrospinning/heat treatment method.

Electrospinning is a known technique which involves processing a polymer solution. In some methods of the invention, the polymer solution is prepared by dissolving a polymeric material and a catalytic material precursor (e.g., a catalytic metal salt) in a suitable solvent. The mixture is mixed to ensure homogeneous distribution of the polymeric material and catalytic material precursor in the solvent. For example, an ultrasonic mixing technique may be used. In some cases, this mixing step occurs at elevated temperatures (e.g., between about 60° C. and about 80° C.) for a desired time (e.g., about 2 hours) to promote dissolution.

In some methods, it is preferable to dissolve the catalytic material precursor (e.g., a catalytic metal salt) in the solvent prior to adding the polymeric material. This order of addition may prevent the polymeric material from cross-linking during the mixing step.

As described further below, in some methods of the invention, the catalytic material precursor may be solid particles of catalytic material (e.g., metal oxides). In these methods, the solid catalytic material particles may be dispersed in the polymer solution which includes the solvent and dissolved polymeric material.

Suitable solvents are known to those of skill in the art and depend, in part, on the polymeric material and the catalytic material precursor. Suitable solvents include N,N-dimethylformamide (DMF), ethanol, methanol, acetone, water, tetrahydrofuran (THF), methylene chloride (MC or dichloromethane) and combinations thereof. It should be understood that other solvents may also be used.

Any suitable polymeric material may be used in the process. In general, the polymeric material should be compatible with electrospinning and convertible to carbon upon heat treatment. Suitable polymer materials include, but are not limited to, polyacrylonitrile (PAN), polyethylene, terephatalate (PET), PBI, polystyrene, poly(2-hydroxyethyl methacrylate), polyvinylidene fluoride, poly(ether imide), styrene-butadiene-styrene triblock copolymer, poly(ferrocenyldimethylsilane), polyethylene oxide (PEO), Rayon, Teflon, DNA, Esthane® 5720, segmented polyether urethane, elastomeric polyurethane urea copolymers, biopolymers (e.g., poly(lactic acid), tetraethyl benzylammonium chloride (TEBAC), polyvinylpyrolidone, polycaprolactone, polycarbonate, poly(vinyl alcohol) (PVA), cellulose acetate (CA), polyacrylic acid (PAA), polyurethane (PU), and polycaprolactone (PCL). It should be understood that other polymeric materials may be used as known to those skilled in the art.

Any suitable catalytic material precursors may be used. In embodiments in which the catalytic material precursor is dissolved in the solvent, the precursor should be sufficiently soluble in the solvent. Examples of suitable catalytic material precursors include salts (organic and/or inorganic) of catalytic metals (when catalytic metals are used). Examples of suitable metal salts include palladium (II) acetate and platinum (IV) chloride.

In embodiments in which the catalytic material precursor is in the form of solid particles, suitable solid particles include oxides of any of the catalytic metals noted above. The solid particles, for example, have sizes on the order of nanometers (e.g., 1 nm–50 nm)

The concentration of the catalytic material precursor (e.g., catalytic metal salt) added to the solution is selected to produce a structure having the desired concentration of catalytic material (per area of the structure). It may be preferable for substantially all of the catalytic material precursor to be converted into catalytic material particles, as described further below. Such substantial conversion can increase the ability to precisely control the catalytic material concentration which can lead to cost savings associated with the catalytic material. To yield catalytic material concentrations on the order of about 0.02–0.2 mg catalytic material/ $cm^2$ area of structure, the concentration of the catalytic material precursor (e.g., catalytic metal salt) may be on the order of 0.001 M–0.10 M. In embodiments in which the catalytic material precursor is in the form of solid particles, the weight percentage of the solid particles added to the solution yields a structure including an equivalent weight percentage of catalytic material.

The concentration of polymeric material added to the solution is generally selected for compatibility with electrospinning. Typical polymeric material concentrations may be between about 8% and about 12% by weight of the solution, and between about 8% and about 9%. Such concentrations generally result in the solution having a suitable viscosity for electrospinning. It should be understood that concentrations outside the above ranges may also be used if compatible with electrospinning.

The electrospinning process involves exposing the polymer solution to an electromagnetic field. In one illustrative method, a voltage is placed between a capillary tube and an electrically conducting substrate (e.g., solid metal plates, metal meshes). For example, the tube may be at a voltage of between about 3 kV and about 50 kV, while the substrate is grounded. The distance between the tip of the capillary tube and the substrate may be between about 1 cm and about 50 cm. The polymer solution may be dispensed relatively slowly (e.g., 0.1 to 10 mL/hour) through the capillary tube in drop form. The solvent evaporates to leave a polymeric material fiber which is electrostatically attracted to the substrate when the electrostatic forces exceed the surface tension of the polymer solution at the tip. In some processes, a continuous polymeric material fiber is formed, though the fiber may break and subsequent fiber(s) may be formed. The structure may be removed from the substrate once a desired thickness and area is achieved.

A general description of an electrospinning process is provided, for example, in "Polymer Nanofibers Assembled by Electrospinning", Frenot et. al, *Current Opinion in Colloid and Interface Science* 8(2003), 64–75, which is incorporated herein by reference.

It should be understood that other electrospinning processes may be used to form the polymeric material fiber structure. Also, other non-electrospinning processes may be used to form the polymeric material fiber structure. However, non-electrospinning processes may not produce fiber structures having all of the advantages described herein.

In some methods, the polymer fiber structures are allowed to dry prior to heat treatment. Although, in other methods, a separate drying step is not utilized.

The heat treatment step generally involves heating the polymeric material fiber structure to sufficient temperatures to convert the polymeric material to carbon. In methods in which the catalytic material precursor is dissolved in the polymer solution, heat treatment also nucleates and grows the catalytic material particles to the desired size. In methods in which the catalytic material precursor is in the form of solid particles, heat treatment can lead to the particles being supported on carbon fiber surfaces (but, typically, does not lead to particle growth). In general, any heat treatment conditions that produce the desired carbon fiber structure including catalytic material particles of the desired size may be utilized.

Typically, during heat treatment, the polymeric material fibers will shrink in dimensions when being converted to carbon. For example, the carbon fiber average diameter may be less than 50% (e.g., about 60%) the average diameter of the polymeric material fiber.

In some case, the heat treatment step involves two stages including heating to a low temperature range followed by heating to a higher temperature range. The low temperature stage may involve heating to temperatures between about 100° C. and about 500° C. to stabilize the polymeric material. The heating rate may be, for example, between about 0.5° C./minute to 10° C./minute (e.g., 1° C./minute). This stabilization step is typically carried out in air and may last between about 10 minutes and about 10 hours with the time depending, in part, on the temperature. In this stabilization step, bonds (e.g., carbon/hydrogen bonds) may be broken to break down the polymeric material structure.

The second stage may involve heating to higher temperatures, such as between about 500° C. and about 3500° C., and, more typically between about 800° C. and about 1100° C. The second stage may involve heat treating the material in an inert atmosphere (e.g., argon) at times between about 1 minute and about 120 minutes. The heating time depends, in part, on the temperature with shorter times being used at higher temperatures. In some methods, it may be preferred to use relatively high temperatures (e.g., 1000° C. or higher) and relatively short times (e.g., 5 minutes or less). Even higher temperatures may be used when the catalytic material precursor is in the form of solid particles (e.g., metal oxide particles), because growth of such particles generally does not occur.

During the high temperature stage, the polymeric material fibers are converted to carbon (at least to some extent, though other residual elements may remain as described above). In methods in which the catalytic material precursor is dissolved in the polymer solution, the high temperature stage also leads to particle nucleation and growth to the desired size.

The temperature and time conditions may be selected to produce catalytic material particles of desired size. For example, in one illustrative method in which the second stage of the heat treatment step involves heating to 800° C., the particles may nucleate after about 40 minutes and may grow to about 20–30 nm after about 60 minutes. If the time is too long, the particles may grow above the desired size (e.g., up to 100 nm and larger).

It should be understood that the heat treatment step may involve heating to a single temperature range or more than two temperature ranges. In any case, the temperature and time of heat treatment is selected produce the desired carbon fiber structure including catalytic material particles of the desired size After heat treatment, the carbon fiber structure including particles may be further processed, if needed, to form the desired final structure. For example, conventional techniques may be used to form electrochemical devices from fiber structures of the invention that function as electrodes in such devices.

In some methods of the invention, the above-described processing steps are performed continuously. For example, the electrospinning process may continually form a polymeric fiber structure which is continuously transferred to a furnace for heat treatment. The structure, for example, may be transferred on a movable belt. The structure is continually moved through the furnace and subjected to heat treatment at appropriate conditions to form a suitable carbon fiber structure. The carbon fiber structure may be removed from the furnace in a continuous fashion and further processed, if needed, to form the desired structure.

It should be understood that other processes may be used to form the carbon fiber structure of the present invention. For example, other methods include growing carbon fibers in a vapor phase transport method, a template synthesis method using epoxy-based solution as carbon precursors, deterministically using catalytic DC plasma-enhanced chemical vapor deposition (DC-PECVD) and CVD processes, amongst others. However, it should be understood that such processes may not produce fiber structures having all of the advantages described herein associated with the electrospinning/heat treatment method.

Structures of the invention may be used in a wide variety of catalytic applications. For example, the structures may be used as electrodes in batteries, fuel cells and other electrochemical device applications.

Figure 2A:
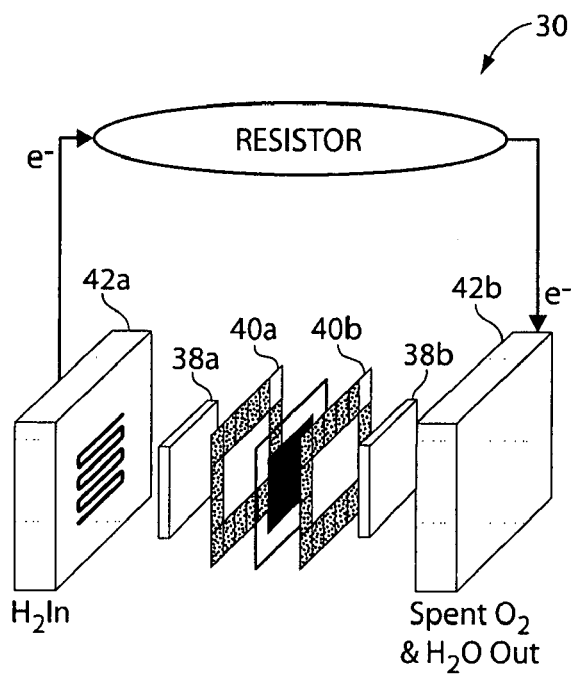
FIG. 2A illustrates a proton exchange membrane fuel cell including carbon fiber structures as electrodes according to an embodiment of the invention.
Figure 2B:
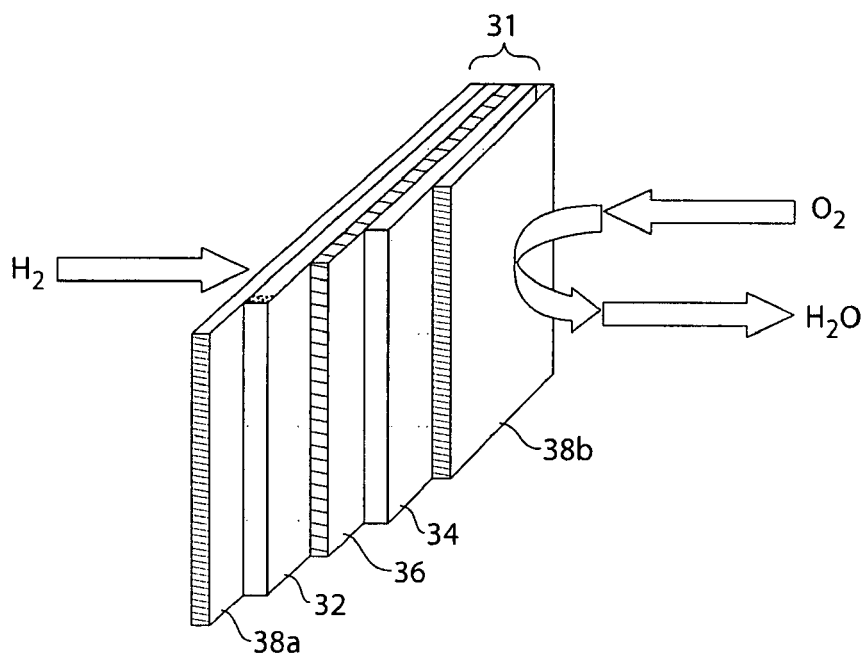
FIG. 2B shows the electrode assembly used in the device of FIG. 2A.

FIG. 2A illustrates a schematic proton exchange membrane fuel cell 30 including carbon fiber structures as electrodes according to an embodiment of the invention. An electrode assembly 31 (as shown in FIG. 2B) includes an anode 32, a cathode 34 and a proton conducting membrane 36 which separates the anode and cathode. The anode and cathode are formed of carbon fiber structures of the invention. The electrode assembly is positioned between respective gas diffusion layers 38a, 38b. As shown, the gas diffusion layers are inserted into respective sub-gaskets 40a, 40b. Graphite plates 42a, 42b are in contact with the respective gas diffusion layers. An electrical circuit is formed between the two graphite plates.

It should be understood that electrochemical devices including carbon fiber structures of the invention may have a variety of other constructions not illustrated herein.

As noted above, the methods of the invention can lead to homogeneous distribution of catalytic material throughout the structure (and electrode). In particular, electrospinning/heat treatment methods can lead to the homogenous distribution and, especially, methods that involve dissolving a catalytic material precursor in the polymer solution. The homogeneous distribution results, in part, from the small catalytic particle sizes, as well as the uniform distribution of the particles throughout the structure. In particular, the electrospinning/heat treatment method (using catalytic material precursors dissolved in the polymer solution) can lead to the uniform distribution and small particles sizes by nucleating a large number of particles relatively uniformly across the structure. The uniform distribution enables structures of the invention to exhibit sufficiently high catalytic activity across the entire area of the structure, even at low catalytic material concentrations.

Furthermore, methods of the invention can accurately control the catalytic material concentration. The concentration may be controlled by adding precise amounts of catalytic material precursor to the polymer solution in the electrospinning process. Also, selecting heat treatment conditions that convert substantially all of the catalytic material precursor to catalytic material particles.

As a result of the accurate control and the sufficient catalytic activity at low concentrations, structures (including electrodes) of the invention may have low catalytic material concentrations which can result in significant material cost savings as compared to other conventional techniques which use higher catalytic material concentrations.

In some embodiments, the catalytic material concentration may be less than 0.2 mg catalytic material/cm$^2$ area of the structure (or electrode) and, in some cases, less than about 0.1 mg/cm (e.g., about 0.05 mg/cm$^2$ or even about 0.02 mg/cm$^2$.). In certain embodiments, it may be desired for the catalytic material concentration to be greater than about 0.02 mg/cm$^2$ to provide sufficient catalytic performance.

The electrospinning/heat treatment methods of the invention may also enable production of very thin structures (including electrodes) with thicknesses noted above. Thinner electrodes may enable using lower total amounts of catalytic material and improved electrical performance, amongst other advantages.

The following is an example which is provided for illustrative purposes. The example is not limiting in any way.

EXAMPLE 1

This example illustrates production of a carbon fiber structure including catalytic particles according to methods of the present invention.

A clear PAN polymer solution was prepared by 1) adding 11 wt % PAN into 7.7 g (8.2 milliliter) N,N-dimethylformamide (DMF), 2) mixing with a magnetic stir bar at room temperature for 2 hours, and 3) heating at 80° C. for 20 minutes. A 0.05 M salt solution was prepared by adding palladium (II) acetate in 2.0 milliliter DMF. The PAN solution was added the salt solution. The final solution was mixed for 5 minutes with a magnetic stir bar at room temperature for 5 minutes to ensure homogeneity.

The homogeneous solution was processed using an electrospinning process. The electric field voltage ranged between 10 kV and 18 kV. The tip-to-plate distance was about 12 cm. The electrospinning process formed a polymeric material fiber membrane.

The polymeric fiber membrane was heat treated in a two stage process. The first stage involved heating to temperature of 280° C. in air for 120 minutes at a heating rate of 1° C./min. The second stage involved heating to 800° C. in argon for various times. The fiber structure was analyzed using an SEM technique at different times during the second stage.

SEM analysis showed that after about 45 minutes, small Pd particles became observable. After about 60 minutes, the particle size distribution was roughly homogeneous and particle size was about 20–30 nm. After about 75 minutes, some of the particles had become greater than about 50 nm.

Figure 3B:
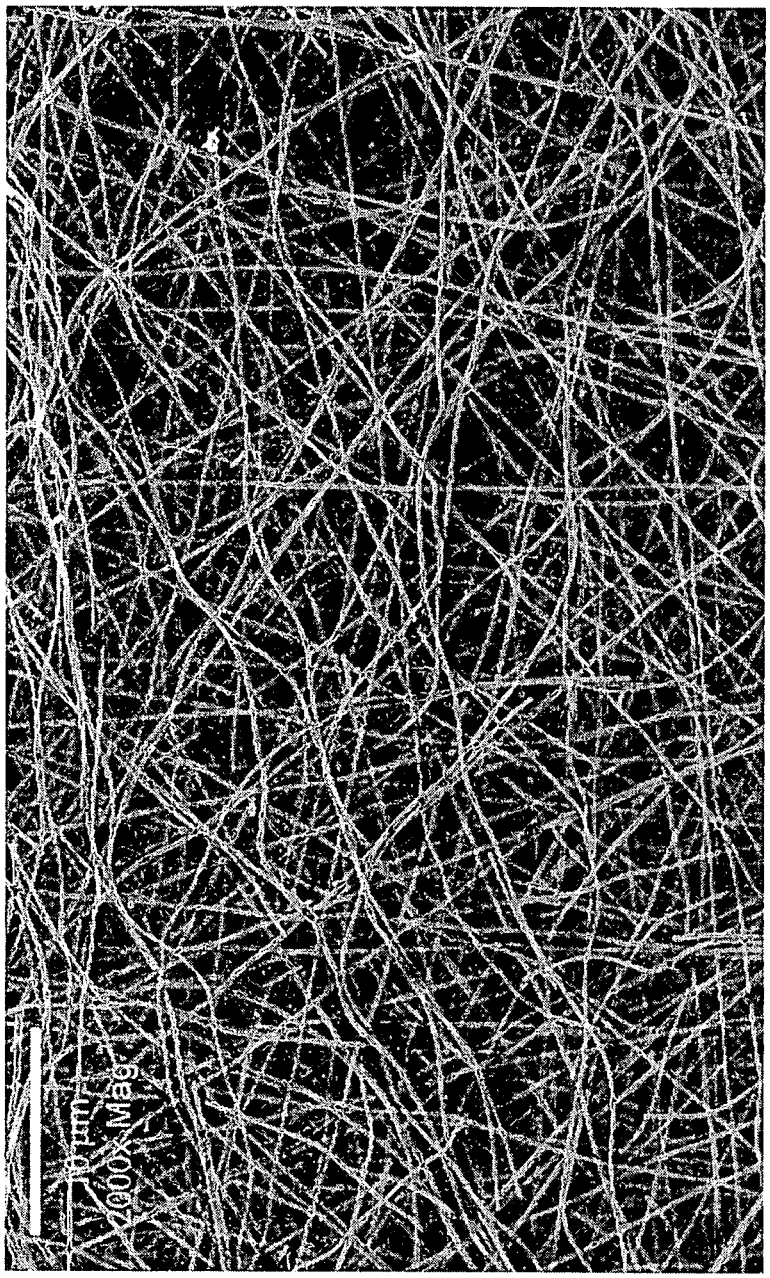
Figure 3C:
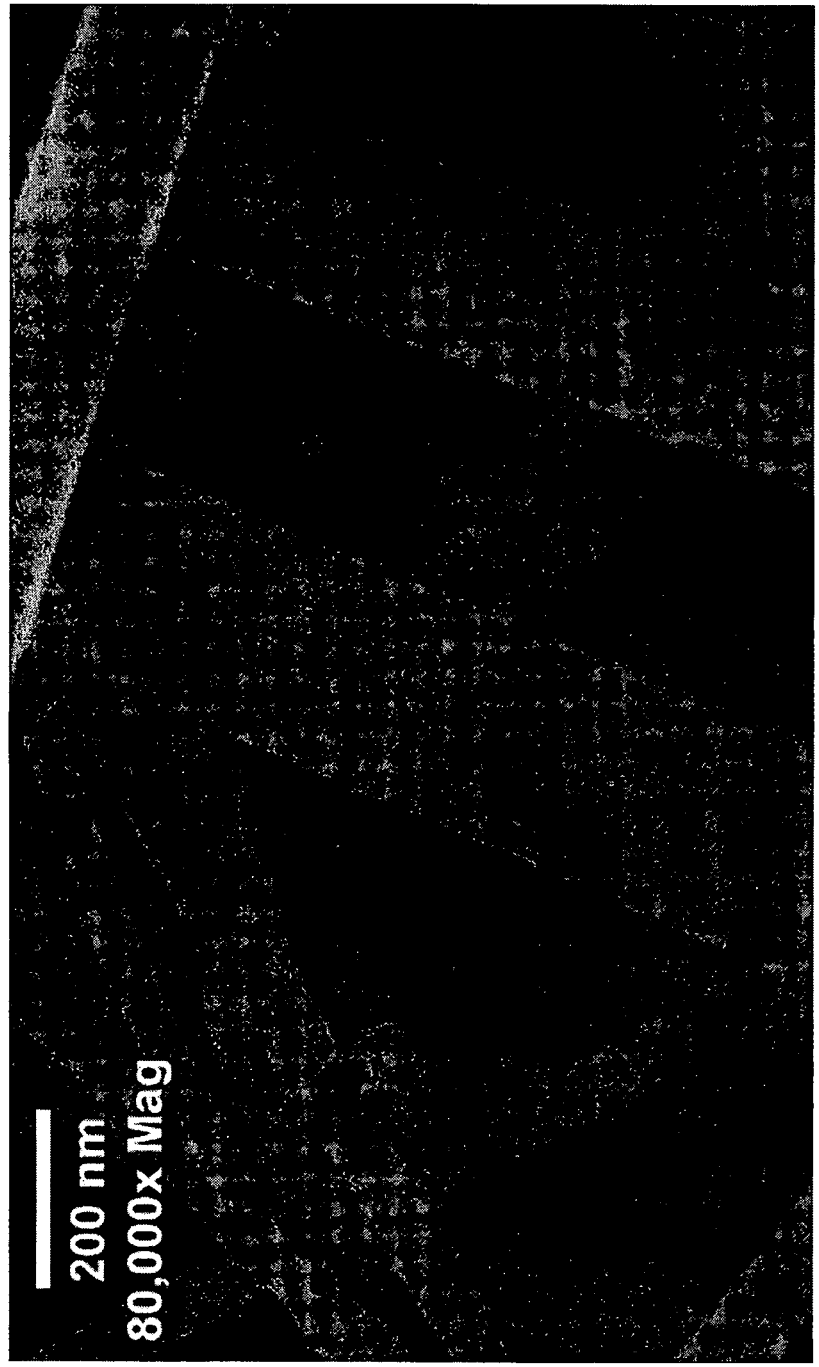

FIGS. 3A–3C are respective SEM photos (at increasing magnification) that show the resulting structure of the carbon fiber membrane after 60 minutes of heat treating at 800° C. FIG. 3C shows a homogeneous distribution of the palladium (i.e., catalytic material) particles supported on carbon fibers of the membrane. The particles have an average particle size of between about 20 and 30 nm.

This example shows how methods of the invention may be used to produce a carbon fiber membrane which includes catalytic material particles supported on the carbon fibers. This example also shows the ability to control catalytic material particle size by processing conditions.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A structure comprising:
   a carbon fiber sheet-like structure having a thickness of less than 10 microns and including at least one carbon fiber having a length of greater than about 500 microns; and
   a catalytic material supported on the carbon fiber sheet-like structure,
   wherein carbon fiber of the structure has an avenge diameter of less than about 500 nanometers.

2. The structure of claim 1, comprising catalytic material particles supported on the carbon fiber structure.

3. The structure of claim 2, wherein the catalytic material particles have an average particle size of less than about 50 nanometers.

4. The structure of claim 2, wherein the catalytic material particles are formed on a surface of a carbon fiber of the structure.

5. The structure of claim 2, wherein the catalytic material particles are dispersed substantially throughout the carbon fiber structure.

6. The structure of claim 1, wherein the catalytic material particles have an average particle size of less than about 20 nanometers.

7. The structure of claim 1, wherein the catalytic material particles have an average particle size of less than about 1 nanometer.

8. The structure of claim 1, wherein the catalytic material concentration is substantially constant throughout the carbon fiber structure.

9. The structure of claim 1, wherein the catalytic material concentration is less than 0.2 mg catalytic material/$cm^2$ area of the carbon fiber structure.

10. The structure of claim 1, wherein carbon fiber of the structure has a conductivity of less than 0.1 Ohm-m.

11. The structure of claim 1, wherein the catalytic material is a metal.

12. The structure of claim 1, wherein the carbon fiber structure includes at least one carbon fiber having a length of greater than about 1 cm.

13. The structure of claim 1, wherein carbon fibers of the carbon fiber structure are solid.

14. The structure of claim 1, wherein a majority of the carbon fibers of the structure have a length of greater than about 500 microns.

15. A structure comprising;
   a carbon fiber structure having a thickness of less than 10 microns and including at least one carbon fiber having a length of greater than about 500 microns; and
   a plurality of catalytic material particles supported on the carbon fiber structure, the catalytic material particles having an average particle size of less than about 50 nanometers.

16. The structure of claim 15, wherein the catalytic material particles have an average particle size of less than about 20 nanometers.

17. The structure of claim 15, wherein the catalytic material particles have an average particle size of less than about 1 nanometer.

18. The structure of claim 15, wherein the catalytic material particles are formed on a surface of a carbon fiber of the structure.

19. The structure of claim 15, wherein the catalytic material particles are dispersed substantially throughout the carbon fiber structure.

20. The structure of claim 15, wherein the catalytic material particle concentration is substantially constant throughout the carbon fiber structure.

21. The structure of claim 15, wherein the catalytic material particle concentration is less than 0.2 mg catalytic material/$cm^2$ area of the carbon fiber structure.

22. The structure of claim 15, wherein carbon fiber of the structure has a conductivity of less than 0.1 Ohm-m.

23. The structure of claim 15, wherein the catalytic material particle is a metal.

24. The structure of claim 15, wherein the carbon fiber structure includes at least one carbon fiber having a length of greater than about 1 cm.

25. The structure of claim 15, wherein carbon fibers of the carbon fiber structure are solid.

26. The structure of claim 15, wherein a majority of the carbon fibers of the structure have a length of greater than about 500 microns.

27. The structure of claim 15, wherein carbon fiber of the structure has an average diameter of less than about 500 nanometers.

28. The structure of claim 15, wherein the carbon fiber structure is a membrane.

29. The structure of claim 15, wherein the carbon fiber structure is a sheet-like structure.

30. A structure comprising:
   a carbon fiber structure including at least one carbon fiber having a length of greater than about 500 microns; and
   a plurality of catalytic metal particles, supported on the carbon fiber structure and having an average particle size of less than about 50 nanometers.

31. The structure of claim 30, wherein the catalytic metal particles have an average particle size of less than about 20 nanometers.

32. The structure of claim 30, wherein the catalytic metal particles have an average particle size of less than about 1 nanometer.

33. The structure of claim 30, comprising catalytic metal particles supported on the carbon fiber structure.

34. The structure of claim 30, wherein the catalytic metal particles are formed on a surface of a carbon fiber of the structure.

35. The structure of claim 30, wherein the catalytic metal particles are dispersed substantially throughout the carbon fiber structure.

36. The structure of claim 30, wherein the catalytic metal particle concentration is substantially constant throughout the carbon fiber structure.

37. The structure of claim 30, wherein the catalytic metal particle concentration is less than 0.2 mg, catalytic material/$cm^2$ area of the carbon fiber structure.

38. The structure of claim 30, wherein carbon fiber of the structure has a conductivity of less than 0.1 Ohm-m.

39. The structure of claim 30, wherein the carbon fiber structure includes at least one carbon fiber having a length of greater than about 1 cm.

40. The structure of claim 30, wherein carbon fibers of the carbon fiber structure are solid.

41. The structure of claim 30, wherein a majority of the carbon fibers of the structure have a length of greater than about 500 microns.

42. The structure of claim 30, wherein carbon fiber of the structure has an average diameter of less than about 500 nanometers.

43. The structure of claim 30, wherein the carbon fiber structure has a thickness of less than 10 micron.

44. The structure of claim 30, wherein the carbon fiber structure is a membrane.

45. The structure of claim 30, wherein the carbon fiber structure is a sheet-like structure.

* * * * *

UNITED STATES PATENT AND TRADEMARK OFFICE
CERTIFICATE OF CORRECTION

PATENT NO. : 7,229,944 B2 Page 1 of 1
APPLICATION NO. : 10/898031
DATED : June 12, 2007
INVENTOR(S) : Yang Shao-Horn et al.

It is certified that error appears in the above-identified patent and that said Letters Patent is hereby corrected as shown below:

IN THE CLAIMS:

Column 11, line 9, (claim 1), please replace "avenge" with --average--.

Signed and Sealed this

Twenty-eighth Day of August, 2007

JON W. DUDAS
*Director of the United States Patent and Trademark Office*

UNITED STATES PATENT AND TRADEMARK OFFICE
CERTIFICATE OF CORRECTION

PATENT NO. : 7,229,944 B2  Page 1 of 1
APPLICATION NO. : 10/898031
DATED : June 12, 2007
INVENTOR(S) : Yang Shao-Horn et al.

It is certified that error appears in the above-identified patent and that said Letters Patent is hereby corrected as shown below:

At column 1, line 5 please insert the following:

-- <u>Statement Regarding Federally Sponsored Research or Development</u>

This invention was made with government support under Grant No. N00014-97-1-0174 awarded by the U.S. Navy. The government has certain rights in the invention. --

Signed and Sealed this

Seventeenth Day of June, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,229,944 B2 | Page 1 of 1 |
| APPLICATION NO. | : 10/898031 | |
| DATED | : June 12, 2007 | |
| INVENTOR(S) | : Yang Shao-Horn et al. | |

It is certified that error appears in the above-identified patent and that said Letters Patent is hereby corrected as shown below:

At column 1, line 5 please insert the following:

-- Statement Regarding Federally Sponsored Research or Development

This invention was made with government support under Grant No. N00014-04-1-0400 awarded by the U.S. Navy. The government has certain rights in the invention. --

This certificate supersedes the Certificate of Correction issued June 17, 2008.

Signed and Sealed this
Third Day of May, 2011

David J. Kappos
*Director of the United States Patent and Trademark Office*